United States Patent
Guo et al.

(10) Patent No.: US 9,753,745 B1
(45) Date of Patent: Sep. 5, 2017

(54) SYSTEM AND METHOD FOR SYSTEM FUNCTION-FLOW OPTIMIZATION UTILIZING APPLICATION PROGRAMMING INTERFACE (API) PROFILING

(71) Applicant: TCL RESEARCH AMERICA INC., San Jose, CA (US)

(72) Inventors: Lifan Guo, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 15/239,653

(22) Filed: Aug. 17, 2016

(51) Int. Cl.
   *G06F 13/00* (2006.01)
   *G06F 9/44* (2006.01)
   *G06N 7/00* (2006.01)

(52) U.S. Cl.
   CPC .......... *G06F 9/4443* (2013.01); *G06N 7/005* (2013.01)

(58) Field of Classification Search
   CPC .......................................... G06F 9/541
   USPC .......................................... 719/328
   See application file for complete search history.

(56) References Cited

U.S. PATENT DOCUMENTS

| | | | | |
|---|---|---|---|---|
| 7,895,579 B2* | 2/2011 | Guerrera | ............. | G06F 11/3419 717/125 |
| 8,046,778 B1* | 10/2011 | Getlin | ............. | G06F 9/54 719/328 |
| 2007/0294673 A1* | 12/2007 | Guerrera | ............. | G06F 11/3419 717/130 |
| 2014/0366000 A1* | 12/2014 | Batabyal | ............. | G06F 8/61 717/120 |
| 2017/0046436 A1* | 2/2017 | Glover | ............. | G06F 17/30867 |

FOREIGN PATENT DOCUMENTS

CN            103731277 A        4/2014

* cited by examiner

*Primary Examiner* — Andy Ho
(74) *Attorney, Agent, or Firm* — Anova Law Group, PLLC (57) ABSTRACT

A method and a non-transitory computer-readable medium having computer program for optimizing a system function-flow of a system capable of performing at least one function and comprising a plurality of components by utilizing application programming interface (API) profiling are provided. The method comprises receiving a request to perform the at least one function of the system from a user; obtaining at least one component required to realize the at least one function requested by the user from the plurality of the components; providing a plurality of APIs to the at least one obtained component to choose from; profiling each of the plurality of APIs to get a performance score of each API; based on the profiled APIs, optimizing the system function-flow of the system; determining corresponding APIs for the optimized system function-flow; and performing the at least one function requested by the user based on the determined APIs.

20 Claims, 5 Drawing Sheets

SYSTEM AND METHOD FOR SYSTEM FUNCTION-FLOW OPTIMIZATION UTILIZING APPLICATION PROGRAMMING INTERFACE (API) PROFILING

FIELD OF THE INVENTION

The present invention relates generally to the field of computer technologies and, more particularly, to system function-flow optimization utilizing application programming interface (API) profiling.

BACKGROUND

Nowadays Internet is experiencing a period of "decentralization". A user's device, called as a "farmer", dedicates a part of its computing power to run a corresponding network and a part of its hard drive to store files or data. The device system is often decomposed into different components regardless of the complexity, in which each component serves a specific purpose for the system. Such a "decentralization" enables each component to be built by thousands of application programming interface (APIs) with various capabilities and limitations.

In particular, a smart system, e.g., a smart device system, may be able to decide which API each component should use to maximize the entire system's performance under a given limitation. For example, a conversation system often includes a voice recognition module, an intention identification module and a question-answer matching module, in which several different APIs may be implement into each module. However, it may be difficult to predict whether these APIs will perform well given different contexts. It is possible that certain APIs may perform better in certain modules than other APIs. Further, it may be difficult for the user to estimate the performance of each API without a big-data testing. Even if the performance of each API could be precisely estimated, optimizing the decisions of choosing APIs given various limitations (such as budget and network latency, etc.) is still highly desired.

The disclosed systems and methods are directed to solve one or more problems set forth above and other problems.

BRIEF SUMMARY OF THE DISCLOSURE

One aspect of the present disclosure includes a method for optimizing a system function-flow of a system capable of performing at least one function and comprising a plurality of components by utilizing application programming interface (API) profiling. The method comprises receiving a request to perform the at least one function of the system from a user; obtaining at least one component required to realize the at least one function requested by the user from the plurality of the components; providing a plurality of APIs to the at least one obtained component to choose from; profiling each of the plurality of APIs to get a performance score of each API; based on the profiled APIs, optimizing the system function-flow of the system; determining corresponding APIs for the optimized system function-flow; and performing the at least one function requested by the user based on the determined APIs.

Another aspect of the present disclosure includes a non-transitory computer-readable medium having computer program for, when being executed by a processor, performing a method for optimizing a system function-flow of a system capable of performing at least one function and comprising a plurality of components by utilizing application programming interface (API) profiling. The non-transitory computer-readable medium comprises receiving a request to perform the at least one function of the system from a user; obtaining at least one component required to realize the at least one function requested by the user from the plurality of the components; providing a plurality of APIs to the at least one obtained component to choose from; profiling each of the plurality of APIs to get a performance score of each API; based on the profiled APIs, optimizing the system function-flow of the system; determining corresponding APIs for the optimized system function-flow; and performing the at least one function requested by the user based on the determined APIs.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

In computer programming, an application programming interface (API) is a set of routine definitions, protocols, and tools for building software and applications. An API expresses a software component in the system in terms of its operations, inputs, outputs, and underlying types, defining functionalities that are independent of their respective implementations. An API also serves as an interface between different software components in the system and facilitates their interaction, similar to the way the user interface facilitates interaction between humans and computers.

Further, an API may be for a web-based system, operating system, or database system, and it provides facilities to develop applications for that system using a given programming. A system, no matter how complex it is, often includes a variety of APIs providing various services and a pipeline for linking these APIs. Various software components in the system may be built by the APIs to achieve a certain function. A system function-flow may describe the order of 'functional' steps or the order of various APIs that are required to perform an aspect of the system.

The present disclosure provides an improved system and method for optimizing system function-flow by utilizing API profiling. Optimizing the system function-flow by utilizing API profiling may include two aspects: quantitatively profiling the APIs and optimizing the system function-flow. In particular, each API may be quantitatively profiled to get a performance score for deciding which API should be chosen in the system and an entire process of choosing APIs may be modeled. A system based on the chosen APIs may be developed as an optimization problem, which may be solved by a disclosed general framework.

Figure 1:
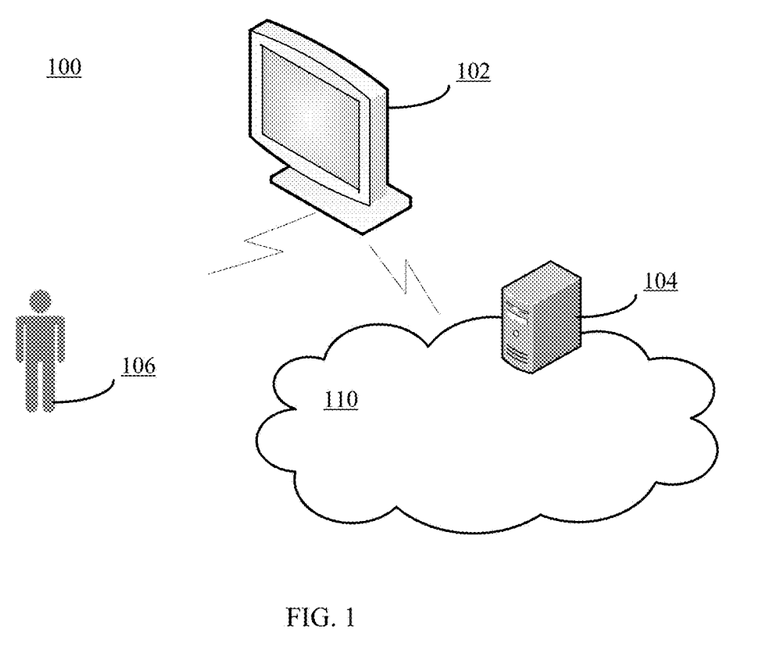
FIG. 1 illustrates an exemplary environment incorporating certain embodiments of the present invention.

FIG. 1 illustrates an exemplary environment 100 incorporating certain embodiments of the present invention. As shown in FIG. 1, the environment 100 may include a user terminal 102, a server 101, a user 106, and a network 110. Other devices may also be included.

The user terminal 102 may include any appropriate type of electronic device with computing capabilities, such as TVs (smart TVs or non-smart TVs), a smart watch, a mobile phone, a smartphone, a tablet, a personal computer (PC), a server computer, a laptop computer, and a digital personal assistant (PDA), etc. Further, the user terminal 102 may be any appropriate content-presentation device capable of presenting texts, images, videos, etc.

The server 101 may include any appropriate type of server computer or a plurality of server computers for providing personalized contents to the user 106. For example, the server 101 may be a cloud computing server. The server 101 may also facilitate the communication, data storage, and data processing between the other servers and the user terminal 102. The user terminal 102, and server 101 may communicate with each other through one or more communication networks 110, such as cable network, phone network, and/or satellite network, etc.

In operation, the user 106 may interact with the user terminal 102 to query and to retrieve various contents and perform other activities of interest, or the user may use voice, hand or body gestures to control the user terminal 102 if speech recognition engines, motion sensor or depth-camera is used by the user terminal 102. The user 106 may also, through the user terminal 102 or a web browser on the user terminal 102, intend to use certain applications (apps) or mobile apps available on the user terminal 102 or online from various servers 101. The user 106 may be a single user or a plurality of users, such as family members.

Figure 2:
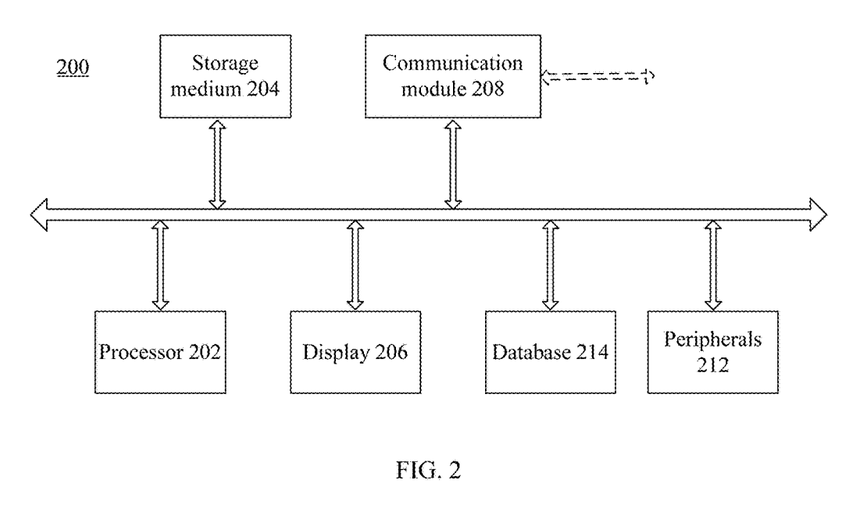
FIG. 2 illustrates an exemplary computing system consistent with disclosed embodiments.

The user terminal 102, and/or server 101 may be implemented on any appropriate computing circuitry platform. FIG. 2 shows a block diagram of an exemplary computing system capable of implementing the user terminal 102, and/or server 101.

As shown in FIG. 2, the computing system 200 may include a processor 202, a storage medium 204, a display 206, a communication module 208, a database 314, and peripherals 312. Certain components may be omitted and other components may be included.

The processor 202 may include any appropriate processor or processors. Further, the processor 202 can include multiple cores for multi-thread or parallel processing. The storage medium 204 may include memory modules, such as ROM, RAM, flash memory modules, and mass storages, such as CD-ROM and hard disk, etc. The storage medium 204 may store computer programs for implementing various processes, when the computer programs are executed by the processor 202.

Further, the peripherals 212 may include various sensors and other I/O devices, such as keyboard and mouse, and the communication module 208 may include certain network interface devices for establishing connections through communication networks. The database 214 may include one or more databases for storing certain data and for performing certain operations on the stored data, such as database searching.

Figure 3:
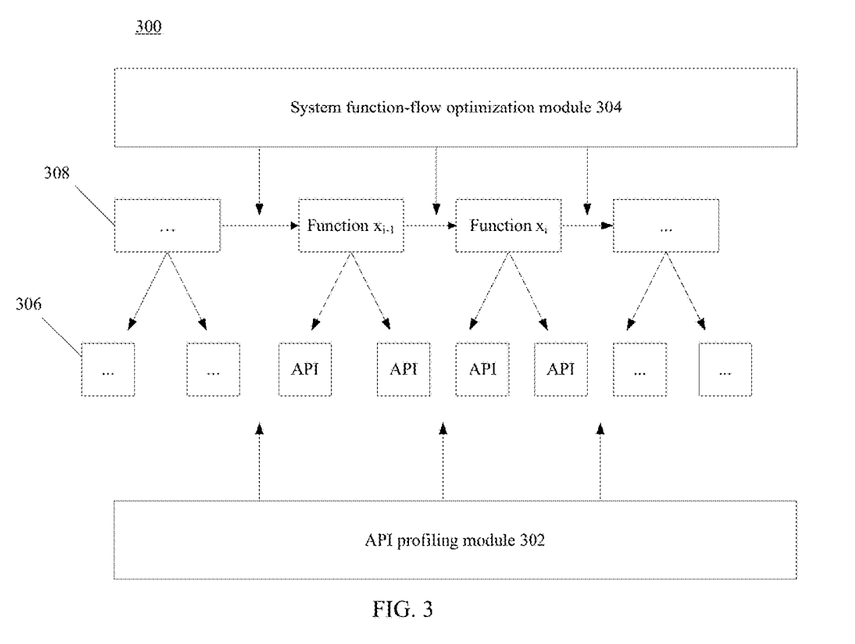
FIG. 3 illustrates an exemplary system for system function-flow optimization by utilizing API profiling consistent with disclosed embodiments.

Returning to FIG. 1, the user terminal 102 and/or server 104 may implement the system for optimizing system function-flow by utilizing API profiling system. FIG. 3 illustrates an exemplary system for optimizing system function-flow by utilizing API profiling 300 consistent with disclosed embodiments. As shown in FIG. 3, the system 300 may include a plurality of components 308, i.e., software components or applications, to achieve various functions. On the other hand, the system 300 may also be provided with a plurality of APIs 306. In particular, the components 308 may be built by the APIs 306 and interacted with each other through the APIs 306. In particular, the system may be able to perform a variety of different functions, and a group of components 308 may be selected to realize the function requested by the user.

The system 300 may further include an API profiling module 302 and a system function-flow optimization module 304. The API profiling module 302 may be configured to quantitatively profile the performance of each API 306 provided to the system 300, given unknown factors and observed data. In particular, the API profiling module 302 may be configured to quantitatively calculate a performance score for each API. In one embodiment, the performance score for each API may be a joint probability or a joint probability distribution of each API given a plurality of hidden variables and a plurality of observations. That is, the unknown factors and observed data may refer to the plurality of hidden variables and the plurality of observations, respectively.

The system function-flow optimization module 304 may be configured to optimize a system function-flow of the system 300, i.e., determine an optimized order of the APIs that are required to perform an aspect of the system 300 given various system limitations (such as budget and network latency, etc.) and the calculated performance score for each API. In one embodiment, when the performance score for each API is a joint probability or a joint probability distribution of each API given a plurality of hidden variables and a plurality of observations, the optimization of the system function-flow may maximize a probability of the system flow.

For example, the system 300 may be denoted a graph $G=\{V, E\}$ having a starting point $x_0 \in V$ and an ending point $x_n \in V$, each $x_i \in V$ denotes a component 308 which achieve a certain goal of the system, the edge $e_{ij}$ denotes an API or a choice of API, and m choices of APIs are denoted as $E_i=\{e_{i1}, e_{i2}, \ldots, e_{im},\}$ for the component $x_i$ with a unknown performance score under a hidden variable $Z=\{z_1, z_2, \ldots, z_n\}$, where m, n, i and j is a positive integer, $i \leq n$, and $j \leq m$. The hidden variable Z may come from system input assumptions. The system 300 may also have a limitation denoted as $C=\{c_1, c_2, \ldots, c_n\}$.

The component $x_i$ is also called as Function $x_i$, and each Function $x_i$ ($1 \leq i \leq n$) may be to be implemented after its previous Function $x_{i-1}$ has been accomplished. A different number n and/or different functions may form a different V, where n may be a predetermined maximum number of functions or components to be included in the system 300.

To optimize the function-flow of the plurality of components of the system may be equivalent to optimize the decision of finding the cheapest possible way of sending a certain request through $x_0$ to $x_n$. To find the cheapest possible way of sending a certain request through $x_0$ to $x_n$, each edge's (i.e., each API's) benefits and cost subjected to Z and C may have to be estimated first. However, it may be substantially difficult to estimate each API's performance given hidden variables and constrains, as well as, to optimize the system function-flow given the limitations.

For example, a conversation system often includes three components: a voice to text module, a question-analyzing module, and a question-answer pairing module. Each module of the conversation system may be provided with various APIs to choose from and, meanwhile, the system may have a network latency limitation. Given a different category of APIs, each module may perform differently. The present disclosure provides an improved method to quantitatively estimate each API's performance under each category given a plurality of observations and, meanwhile, optimize the entire system based on the network latency limitations and the estimated API's performance score.

The disclosed method for system function-flow optimization by utilizing API profiling may involve two models: a variational inference model and a system flow optimization model. The variational inference model may estimate a joint probability or a joint probability distribution of each API given a plurality of hidden variables. For each API, the joint probability distribution for the plurality of hidden variables is a probability distribution that gives the probability that each of the plurality of hidden variables falls in any particular range or discrete set of values specified for that hidden variable. The system flow optimization model may maximize a probability of the system flow.

That is, referring to FIG. 3, the API profiling module 302 may be configured to estimate a joint probability or a joint probability distribution of each API given a plurality of hidden variables, based on the variational inference model. The system function-flow optimization module 304 may be configured to maximize a probability of the system flow, based on the system flow optimization model.

Figure 4:
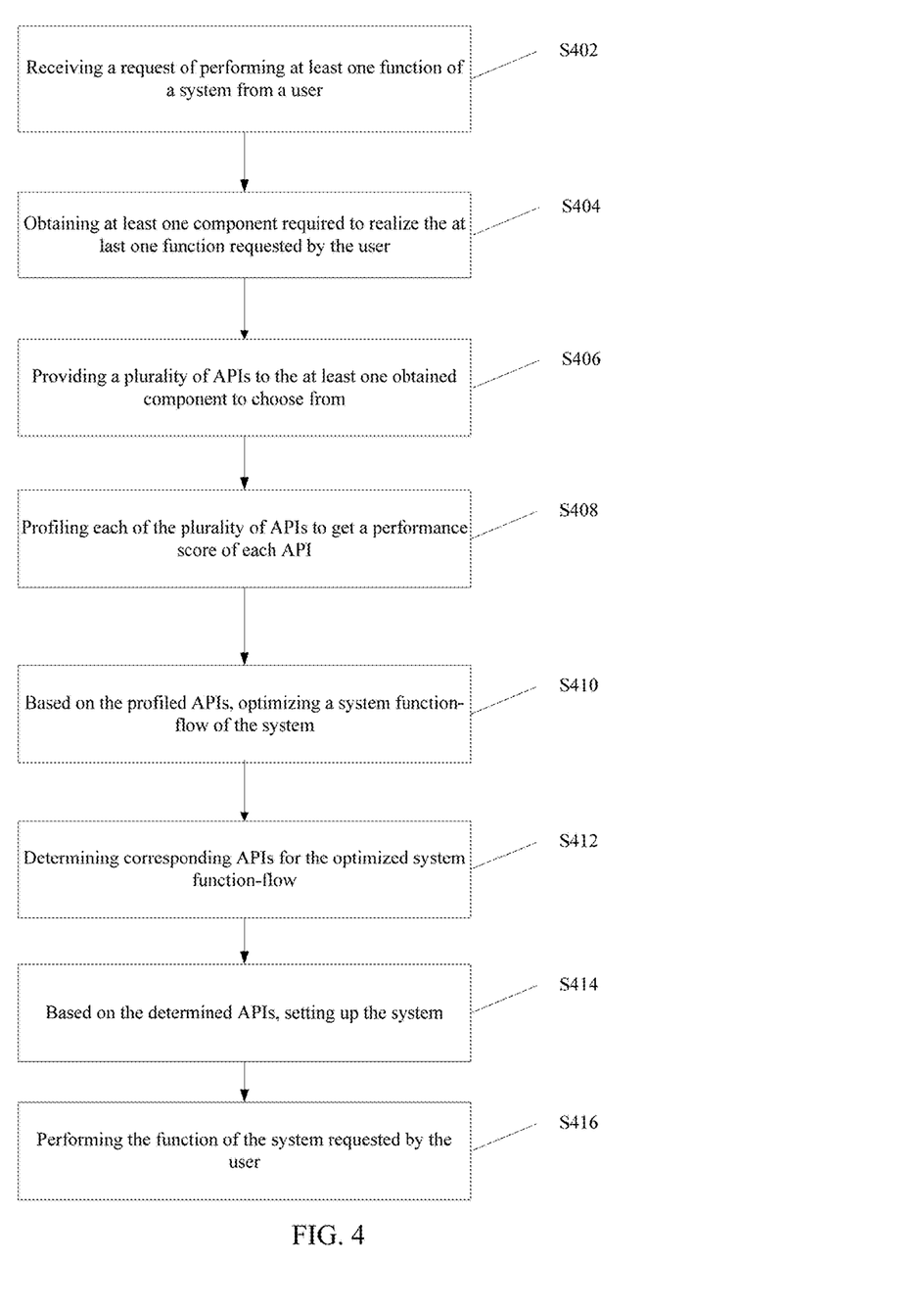
FIG. 4 illustrates a flow chart of an exemplary method for system function-flow optimization by utilizing API profiling consistent with disclosed embodiments.

FIG. 4 illustrates a flow chart of an exemplary method for system function-flow optimization by utilizing API profiling consistent with disclosed embodiments. The system may comprise a plurality of components and may be able to perform at least one function by selecting at least one component from the plurality of components. Further, the may be able to perform different functions by selecting different groups of components.

As shown in FIG. 4, at the beginning, a request to perform at least one function of the system is received from a user (S402). The request may be received in various ways, for example, manually inputting by the user, selecting from a dropdown list or clicking icons provided by the system, selecting from a search engine interface provided by the system, etc. Based on the received user request, at least one component required to realize the function requested by the user is obtained from the plurality of components (S404). In particular, each component may realize a certain sub-function in a function-flow of the system, and the plurality of components together may realize the certain function of the system requested by the user.

After the components required to realize the certain function of the system are identified, a plurality of APIs for each component to choose from are provided to each component (S406). APIs often have different categories, such as ASPI for SCSI device interfacing, Java APIs, OpenGL cross-platform graphics API, Server Application Programming Interface (SAPI), and OpenAL cross-platform sound API, etc. Components performing different sub-functions may require different categories of APIs.

After the plurality of APIs are provided to each component, each of the plurality of APIs provided to the component is profiled (S408). In particular, each of the plurality of APIs provided to the component may be profiled to get a performance score. In one embodiment, the performance score for each API may be a joint probability or a joint probability distribution of each API given a plurality of hidden variables and a plurality of observations, and the API may be profiled by a variational inference model.

Modern data analysis often requires computation with massive data. For example, a device system may need various music services, which may be provided by various APIs. To decide which music service the device system should use, an archive of log data, generated by testing cases, may be adopted, and the corresponding performance in each different theme may be evaluated. On the other hand, the device system may need various recommender services, which may be provided by various online shopping APIs. Assume different API perform differently in various categories, data from users may be collected to decide which recommender service the device system should use.

The above-mentioned two problems may be generalized as the following problems. Given N observations $x=x_{1:N}$ representing the observations by using a certain API, a vector of global hidden variables $\beta$ representing unknown parameter, M hidden variables $z=z_{1:m}$ representing the hidden variables, such as themes, categories, and latency, etc., the problem may be converted to estimate a variational distribution $Q(z) \approx P(z|x)$, where $\beta$ is already included in z. The hidden variables may vary, for example, in the conversation system, the hidden variables may vary according to the context going to be applied with.

According to mean field variational Bayes method, Kullback-Leibler divergence (KL-divergence) of P from Q may be adopted as the choice of dissimilarity function, i.e., $Q(z) \approx P(z|x)$. The KL-divergence may indicate the distance between P and Q, which may make the minimization tractable. The KL-divergence for variational inference is:

$$D_{KL}(Q \| P) = \sum_z Q(z) \log \frac{Q(z)}{P(Z|X)} = \sum_z Q(z) \log \frac{Q(z)}{P(Z,X)} + P(X) \quad (1)$$

Because P(X) is fixed, to minimize $D_{KL}(Q \| P)$ may be equivalent to maximize $$-\sum_z Q(z) \log \frac{Q(z)}{P(Z,X)},$$

which is denoted as L(Q):

$$L(Q) = \Sigma_Z Q(Z) \log P(Z,X) - \Sigma_Z Q(Z) \log Q(Z) = E_{Q(Z)} \log P(Z,X) + H(Q) \quad (2)$$

Then, the variational distribution Q(Z) is assumed to factorize over some distribution over some partition of latent variables. Thus, $Q(Z) = \Pi_M q_i(Z_i|X)$. To best estimate $q_j^*$, the following Equation (3) may be used:

$$q_j^*(Z_j | X) = \frac{e^{E_{i \neq j}[\ln p(z, x)]}}{\int e^{E_{i \neq j}[\ln p(z, x)]} dZ_j} \quad (3)$$

where i≠j means taking all the other variables which are not in the partition.

For example, in a process of calling a certain API, a set of observations of calling the certain API may be obtained. Assume the feedback of calling the certain API is from a Gaussian distribution having unknown mean and unknown variance, the unknown mean and the unknown variance may have to be estimated. The joint probability of all hidden variables of each API is rewritten as:

$$P(X,u,t)=P(X|u,t)P(u|t)P(t) \quad (4)$$

where the individual factors are:

$$P(X|u,t)=\Pi_{n=1}^{N}(x_n|u,t^{-1}) \quad (5)$$

$$P(u|t)=N(u|u_0,(\lambda_0,t^{-1}) \quad (6)$$

$$P(t)=\text{Gama}(t|a_0,b_0) \quad (7)$$

Figure 5:
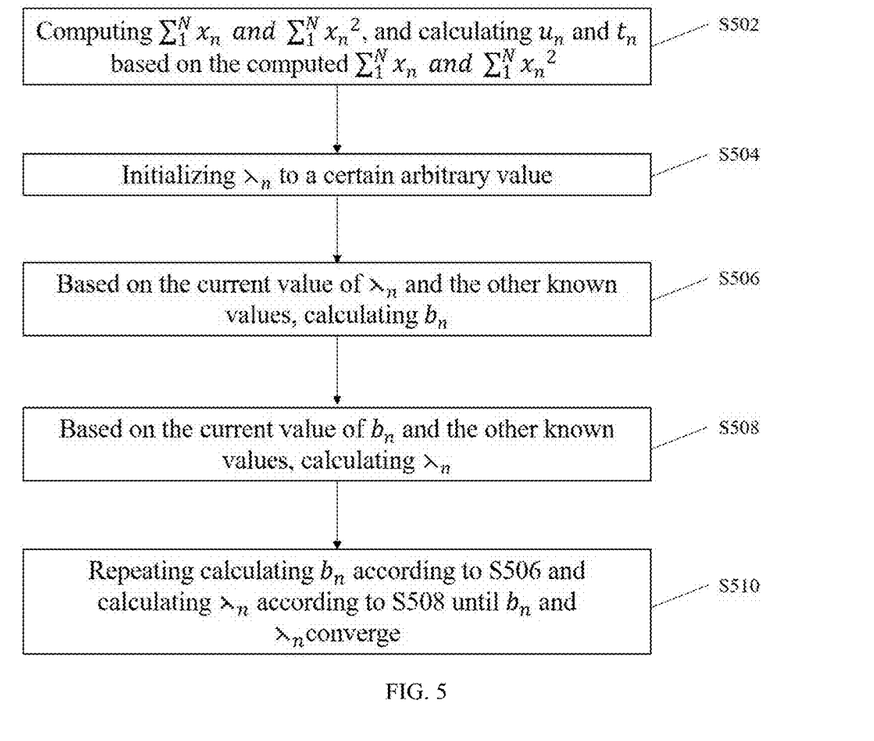
FIG. 5 illustrates a flow chart of an exemplary method for API profiling consistent with disclosed embodiments.

Based on the above discussion, the algorithm may be summarized and the corresponding flow chart is illustrated in FIG. 5. FIG. 5 illustrates a flow chart of an exemplary method for API profiling consistent with disclosed embodiments. As shown in FIG. 5, the method for API profiling may include the following steps:

Step S502: computing $\Sigma_1^N x_n$ and $\Sigma_1^N x_n^2$, and calculating $u_n$ and $t_n$ based on the computed $\Sigma_1^N x_n$ and $\Sigma_1^N x_n^2$;

Step S504: initializing $\lambda_n$ to a certain arbitrary value;

Step S506: based on the current value of $\lambda_n$ and the other known values, calculating $b_n$;

Step S508: based on the current value of $b_n$ and the other known values, calculating $\lambda_n$;

Step S510: repeating steps S506 and S508 until converge.

Thus the values of the mean and the variance may be obtained, and any properties of each API may be quantitatively computed based on the obtained mean and variance, for example, how each API satisfies the needs of the system.

After each API is profiled, the system function-flow is optimized (S410). In particular, each API may be profiled based on the variational inference model, in which the benefits and the costs of each API may be calculated based on the variational inference model. The benefits and the costs of each API are denoted as P(Z|X) and P(C|X), respectively. Assume C and Z are independent, thus, C and Z may be inferred in a same way. The optimization of the system function-flow may be treated as a minim-cost flow problem: given the directed graph G=(V,E) with a source vertex s∈V and a sink vertex t∈V, where each edge (u,v)∈E has the benefits P(Z|X) and the costs P(C|X).

In one embodiment, the optimization problem may be solved by network simplex algorithm. The network simplex method is an adaptation of the bounded variable primal simplex algorithm. The basis is represented as a rooted spanning tree of the underlying network, in which variables are represented by arcs, and the simplex multipliers by node potentials. At each iteration, an entering variable is selected by some pricing strategy, based on the dual multipliers (node potentials), and forms a cycle with the arcs of the tree. The leaving variable is the arc of the cycle with the least augmenting flow. The substitution of entering for leaving arc, and the reconstruction of the tree is called a pivot. When no non-basic arc remains eligible to enter, the optimal solution has been reached.

After optimizing the system function-flow, APIs for the optimized system function-flow are determined (S412). Based on the determined APIs, each component is built, and the system is set up (S414). After the system is set-up, the function of the system requested by the user is performed (S416).

For example, the user may request a smart device or a smart device system (e.g., a smart phone) to perform a conversation function (e.g., Siri in Iphone) by clicking a corresponding icon on a home screen. According to the received user request, the system may identify three components or three modules to realize the conversation function: a voice to text module, a question-analyzing module, and a question-answer pairing module. In particular, the voice to text module may be configured to translate voice input from the user to readable text, the question-analyzing module may be configured to recognize and analyze any questions drawn from the text, and the question-answer pairing module may be configured to find a proper answer to the question from a database. That is, each of the three components may perform a different sub-function, and the three components together may realize the conversation function requested by the user.

After the three components are obtained, a plurality of APIs for each of the three components to choose from are provided to each component, in which each of the plurality of APIs is profiled to get a performance score. Based on the calculated API's performance score and the network latency limitations, the system function-flow may be optimized, and corresponding APIs may be determined for the optimized system function-flow. Then the three components may be built and interacted with each other through the determined APIs, and the conversation function of the system may be realized successfully.

Further, in realizing the conversation function of the device system, the disclosed method for system function-flow optimization by utilizing API profiling may provide the device system with an improved approach of answering questions by utilizing a neural conversational model and taking contextual information into consideration. With the help of neural conversational model, the question-answer pair may be trained without handcrafted rules. Given the contextual information, the question may be matched with a better answer. Moreover, words embedded presentation of context may be easily applied to realize other tasks or functions of the device system.

The disclosed system and method for system function-flow optimization by utilizing API profiling may not be limited to any domain, but may be adopted in various interesting applications without limitations. The disclosed system and method may not only estimate the API performance given certain criteria, but also optimize the system function-flow which arranges different APIs.

Those of skill would further appreciate that the various illustrative modules and method steps disclosed in the embodiments may be implemented as electronic hardware, computer software, or combinations of both. To clearly illustrate this interchangeability of hardware and software, various illustrative units and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for optimizing a system function-flow of a system capable of performing at least one function and comprising a plurality of components by utilizing application programming interface (API) profiling, comprising:
   receiving a request to perform the at least one function of the system from a user;
   obtaining at least one component required to realize the at least one function requested by the user from the plurality of the components;
   providing a plurality of APIs to the at least one obtained component to choose from;
   profiling each of the plurality of APIs to get a performance score of each API;
   based on the profiled APIs, optimizing the system function-flow of the system;
   determining corresponding APIs for the optimized system function-flow; and
   performing the at least one function requested by the user based on the determined APIs.

2. The method for system function-flow optimization by utilizing API profiling according to claim 1, wherein profiling each of the plurality of APIs to get a performance score of each API further includes:
   based on a variational inference model, estimating a joint probability of each API given a plurality of hidden variables and a plurality of observations.

3. The method for system function-flow optimization by utilizing API profiling according to claim 2, wherein:
   estimating a joint probability of each API given a plurality of hidden variables and a plurality of observations is equivalent to estimate $Q(z) \approx P(z|x)$,
   where $Q(z)$ denotes a variational distribution, $x=x_{1:N}$ denotes N observations of calling each API, $z=z_{1:m}$ denotes M hidden variables, N and M are positive integers, N>1, and M>1.

4. The method for system function-flow optimization by utilizing API profiling according to claim 3, wherein:
   a solution of $Q(z) \approx P(z|x)$ is a Kullback-Leibler divergence (KL-divergence) of P from Q, wherein the KL-divergence of P from Q is as:

$$D_{KL}(Q\|P) = \sum_z Q(z) \log \frac{Q(z)}{P(Z|X)} = \sum_z Q(z) \log \frac{Q(z)}{P(Z,X)} + P(X).$$

5. The method for system function-flow optimization by utilizing API profiling according to claim 4, wherein:
   minimizing $D_{KL}(Q\|P)$ is equivalent to maximize $$-\sum_z Q(z) \log \frac{Q(z)}{P(Z,X)}$$

denoted as L(Q), where
L(Q)=$\Sigma_Z Q(Z) \log P(Z,X) - \Sigma_Z Q(Z) \log Q(Z) = E_{Q(Z)} \log P(Z,X) + H(Q)$,
$Q(Z) = \Pi_M q_t(Z_t|X)$, and $$q_j^*(Z_j|X) = \frac{e^{E_{i \neq j}[\ln p(z,x)]}}{\int e^{E_{i \neq j}[\ln p(z,x)]} dZ_j}.$$

6. The method for system function-flow optimization by utilizing API profiling according to claim 5, wherein:
   the joint probability of the hidden variables of each API is rewritten as:

$P(X,u,t)=P(X|u,t)P(u|t)P(t)$, where
$P(X|u,t)=\Pi_{n=1}^N N(x_n|u,t^{-1})$,
$P(u|t)=N(u|u_0,(\lambda_0,t^{-1})$, and
$P(t)=\text{Gama}(t|a_0,b_0)$.

7. The method for system function-flow optimization by utilizing API profiling according to claim 6, wherein:
   $x=x_{1:N}$ has a Gaussian distribution.

8. The method for system function-flow optimization by utilizing API profiling according to claim 7, further including:
   calculating a mean and a variance of the Gaussian distribution by
   computing $\Sigma_1^N x_n$ and $\Sigma_1^N x_n^2$, and calculating $u_n$ and $t_n$ based on the computed $\Sigma_1^N x_n$ and $\Sigma_1^N x_n^2$;
   initializing $\lambda_n$ to a certain arbitrary value;
   based on the current value of $\lambda_n$ and the other known values, calculating $b_n$;
   based on the current value of $b_n$ and the other known values, calculating $\lambda_n$; and
   repeating calculating $b_n$ and calculating $\lambda_n$ until $b_n$ and $\lambda_n$ converge.

9. The method for system function-flow optimization by utilizing API profiling according to claim 1, wherein:
   based on the profiled APIs, optimizing a system function-flow of the system is equivalent to a minim-cost flow problem: given a graph G=(V,E) with a source vertex s∈V and a sink vertex t∈V,
   wherein the graph G=(V,E) denotes the system, each edge (u,v)∈E denotes each API provided to the system, and each API has benefits P(Z|X) and costs P(C|X).

10. The method for system function-flow optimization by utilizing API profiling according to claim 9, wherein:
    the minim-cost flow problem is solved by a network simplex algorithm.

11. A non-transitory computer-readable medium having computer program for, when being executed by a processor, performing a method for optimizing a system function-flow of a system capable of performing at least one function and comprising a plurality of components by utilizing application programming interface (API) profiling, the method comprising:
    receiving a request to perform the at least one function of the system from a user;
    obtaining at least one component required to realize the at least one function requested by the user from the plurality of the components;
    providing a plurality of APIs to the at least one obtained component to choose from;
    profiling each of the plurality of APIs to get a performance score of each API;
    based on the profiled APIs, optimizing a system function-flow of the system;
    determining corresponding APIs for the optimized system function-flow;
    based on the determined APIs, setting up the system; and
    performing the at least one function requested by the user.

12. The non-transitory computer-readable medium according to claim 11, wherein profiling each of the plurality of APIs to get a performance score of each API further includes:
based on a variational inference model, estimating a joint probability of each API given a a plurality of hidden variables and and a plurality of observations.

13. The non-transitory computer-readable medium according to claim 12, wherein:
estimating a joint probability of each API given a plurality of hidden variables and and a plurality of observations is equivalent to estimate $Q(z) \approx P(z|x)$,
where $Q(z)$ denotes a variational distribution, $x=x_{1:N}$ denotes N observations of calling each API, $z=z_{1:m}$ denotes M hidden variables, N and M are positive integers, N>1, and M>1.

14. The non-transitory computer-readable medium according to claim 13, wherein:
a solution of $Q(z) \approx P(z|x)$ is a Kullback-Leibler divergence (KL-divergence) of P from Q, wherein the KL-divergence of P from Q is as:

$$D_{KL}(Q\|P) = \sum_z Q(z)\log\frac{Q(z)}{P(Z|X)} = \sum_z Q(z)\log\frac{Q(z)}{P(Z,X)} + P(X).$$

15. The non-transitory computer-readable medium according to claim 14, wherein:
minimizing $D_{KL}(Q\|P)$ is equivalent to maximize $$-\sum_z Q(z)\log\frac{Q(z)}{P(Z,X)}$$

denoted as L(Q),
where
$L(Q)=\Sigma_Z Q(Z)\log P(Z,X)-\Sigma_Z Q(Z)\log Q(Z)=E_{Q(Z)}\log P(Z,X)+H(Q)$,
$Q(Z)=\Pi_M q_i(Z_i|X)$, and $$q_j^*(Z_j|X) = \frac{e^{E_{i \neq j}[\ln p(z,x)]}}{\int e^{E_{i \neq j}[\ln p(z,x)]}dZ_j}.$$

16. The non-transitory computer-readable medium according to claim 15, wherein:
the joint probability of the hidden variables of each API is rewritten as:
$P(X,u,t)=P(X|u,t)P(u|t)P(t)$,
where
$P(X|u,t)=\Pi_{n=1}^N N(x_n|u,t^{-1})$,
$P(u|t)=N(u|u_0,(\lambda_0,t^{-1}))$, and
$P(t)=Gama(t|a_0,b_0)$.

17. The non-transitory computer-readable medium according to claim 16, wherein:
$x=x_{1:N}$ has a Gaussian distribution.

18. The non-transitory computer-readable medium according to claim 17, further including:
calculating a mean and a variance of the Gaussian distribution by computing $\Sigma_1^N x_n$ and $\Sigma_1^N x_n^2$, and calculating $u_n$ and $t_n$ based on the computed $\Sigma_1^N x_n$ and $\Sigma_1^N x_n^2$;
initializing $\lambda_n$ to an arbitrary value;
based on the current value of $\lambda_n$ and the other known values, calculating $b_n$;
based on the current value of $b_n$ and the other known values, calculating $\lambda_n$; and
repeating calculating $b_n$ and calculating $\lambda_n$ until $b_n$ and $\lambda_n$ converge.

19. The non-transitory computer-readable medium according to claim 11, wherein:
based on the profiled APIs, optimizing a function-flow of the system is equivalent to a minim-cost flow problem:
given a graph G=(V,E) with a source vertex s∈V and a sink vertex t∈V,
wherein the graph G=(V,E) denotes the system, each edge (u,v)∈E denotes each API provided to the system, and each API has benefits P(Z|X) and costs P(C|X).

20. The non-transitory computer-readable medium according to claim 19, wherein:
the minim-cost flow problem is solved by a network simplex algorithm.

* * * * *